July 23, 1940.   S. J. ZAND   2,208,656
AUTOMATIC WEATHER ADJUSTMENT FOR AUTOMATIC PILOTS
Filed Oct. 12, 1937
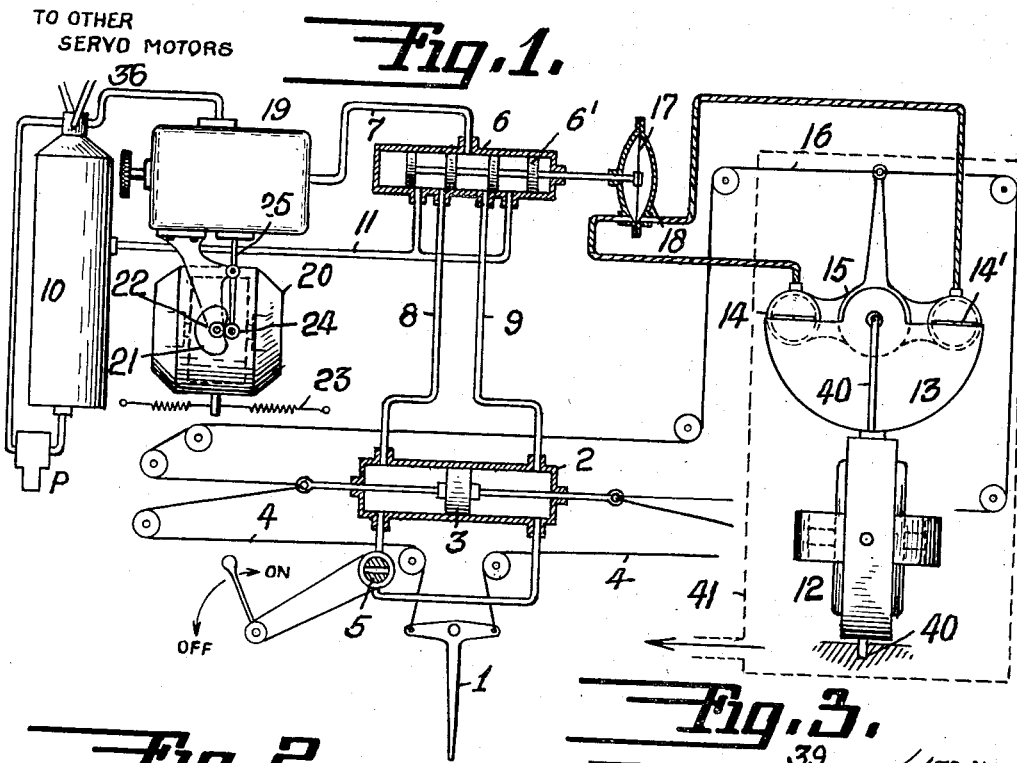
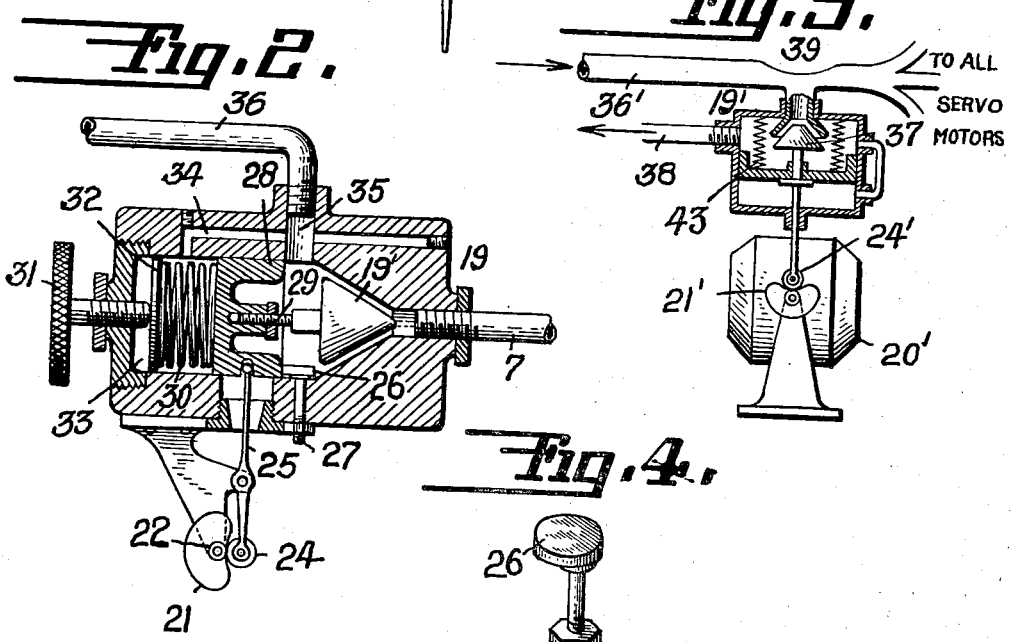
INVENTOR
Stephen J. Zand
BY Herbert H. Thompson
HIS ATTORNEY.

Patented July 23, 1940

2,208,656

UNITED STATES PATENT OFFICE 2,208,656

AUTOMATIC WEATHER ADJUSTMENT FOR AUTOMATIC PILOTS

Stephen J. Zand, Forest Hills, N. Y., assignor to Sperry Gyroscope Company, Inc., Brooklyn, N. Y., a corporation of New York Application October 12, 1937, Serial No. 168,573

9 Claims. (Cl. 244—76)

This invention relates to automatic pilots for aircraft and has especial application to the type of automatic pilot having hydraulic operation of the servomotors for the several controls, as shown in the patent to Sperry, Carlson and Bates, #1,992,970, dated March 5, 1935.

In this type of pilot there has been provided for some years throttle valves in the oil supply line to each servomotor to enable the operator to adjust the rate of flow of the oil, and consequently the speed or rate of response of the servo unit. These valves, usually termed "speed valves," are adjusted by the human pilot to suit varying atmospheric conditions and also to adapt the automatic pilot installation to the particular characteristics of the airplane on which it is mounted.

According to the present invention, I provide an automatic means for regulating these throttle valves during flight, so that the rate of operation of the servomotor is made more truly proportional to the rate of angular movements, i. e., yaw, pitch and roll of the craft, so that more accurate control is secured than in the present pilot. As an actuating means, I propose to use a gyroscope of the two degree of freedom type, one for each axis of turn of the craft, i. e., one for turns in azimuth or yaw, one for pitch, and one for roll, but in the drawing, for simplicity, I have shown only one control, for example, steering in azimuth.

An alternative system according to my invention is to control the pressure delivered by the pump in accordance with rates of turn, etc. In this case, only one valve and one rate gyroscope need be used, since the change in delivered pressure would affect all three servomotors and, in practice, when the angular rate about one axis varies due to disturbed atmospheric conditions, the rate about the other two will usually also vary in proportion.

While I have shown my invention as applied to a particular type of automatic pilot, it will be obvious to those skilled in the art that it may be applied to any type of automatic pilot, pneumatic, hydraulic or otherwise, by varying the type of speed control device to suit the particular type of pilot employed.

Referring to the drawing, showing my invention in diagrammatic form:

Fig. 1 is a diagram showing my invention applied to the azimuth automatic control system of an automatic pilot with a pneumatic pick-off from the directional gyroscope controlling a hydraulic rudder servomotor.

Fig. 2 is a sectional view, on a larger scale, of the throttle or speed valve employed.

Fig. 3 is a sectional view of a by-pass valve for use in the modified form of the invention.

Fig. 4 is a detail.

The rudder or other control surface of the plane is represented at 1, which is turned from the servomotor, shown as comprising a cylinder 2 and a piston 3 connected to the rudder through wires 4. The servomotor is preferably of the hydraulic (oil) type, although air may be used. A manually operated by-pass or throwout valve 5 is shown. The flow of the fluid to and from the cylinder is controlled from a relay valve 6 which directs oil from the pump P and supply pipes 36 and 7 into one or the other of pipes 8 and 9 leading to the two ends of the cylinder, the valve at the same time connecting the other pipe to the sump 10 through pipe 11. The position of the piston valve 6' of valve 6 is shown as controlled pneumatically from the standard of position or attitude employed, which is in this instance a directional gyroscope 12, by means of an air pick-off device thereon which may constitute a semicircular plate 13 secured to the gyroscope and adjustable air port members 14 and 14' mounted on a follow-up block 15 which is turned through follow-up wires 16 leading back to the piston 3. It will be understood that this showing is diagrammatic only, and that disc 13 and block 15, although really turning about the vertical axis 40—40 of gyroscope 12, are shown in plan for the sake of showing all parts clearly in one view. Details of these parts are shown in said prior patent. Air being continuously exhausted from the casing 41 of the gyroscope, the rate of air flow through the two ports 14 and 14' is varied as the relative position of the ports and the cut-off plate varies. Said ports are connected to the opposite halves or compartments of a chamber 18 separated by a flexible diaphragm 17 or other piston, in both of which compartments there is a small leak. It will be evident, therefore, that the pressure on the two sides of the diaphragm will vary upon relative movement of the gyroscope and ports, resulting in movement of the connected piston valve 6'.

All of the foregoing parts are well known in the art and need not be further described.

According to my invention, I place in the supply pipe 7 leading to the valve 6 a throttle valve 19 controlled from a rate of turn device, such as a two degree of freedom gyroscope or turn indicator type gyroscope 20. Said gyroscope is shown as having a cam 21 in the transverse trunnion 22 thereof, on which the casing of the gyroscope is mounted fore and aft on the craft, the spin axis being athwartship, and the gyroscope being normally yieldingly centralized by springs 23. With the gyroscope in the central or neutral position, the cam roller 24 on lever 25 rests at the lowest point on the cam, but if the gyroscope precesses in either direction, lever 25 will be rotated counter-clockwise an amount proportional to the extent of precession, which in turn is proportional to the rate of turn or yaw. Lever 25 is pivotally connected indirectly at its inner end to the valve proper 19', so that when the gyroscope is centralized, the valve 19 is in its maximum throttling position. Said valve, however, is prevented from completely closing by an adjustable cam 26 mounted on the end of stem 27 and acting as an adjustable stop against which the inner end of the piston 28 bears, to which lever 25 is pivotally joined. Said piston 28 is shown as adjustably connected to the throttle valve 19 through a threaded stem 29 and the piston is normally yieldingly held inwardly by spring 30 against stop 26. The tension of spring 30 may be adjusted by set screw 31, the inner end of which bears on a plate 32 within the cylindrical chamber 33 which houses the spring and piston.

When the rate gyro precesses in either direction, the piston 28 will be moved to the left in Fig. 2 an amount proportional to the rate of turn or yaw, thus decreasing the throttling of the oil and permitting a greater rate of flow to the servomotor. Preferably, both sides of the piston are balanced to compensate for the varying oil pressure as by a small channel 34 connecting the oil supply port 35 with the chamber 33 in the rear of the piston.

While in the operation of the standard automatic pilot there is a limited amount of control of the rate of oil flow in the servomotor as the ports leading to pipes 8 and 9 are gradually uncovered by valve 6', this only occurs through the first one or two degrees of deviation. Thereafter the ports are fully opened. According to my invention, however, the rate of flow is further controlled in accordance with the rate of turn by automatically adjusting the throttle valve 19 in accordance with said rate and regardless of the direction of deviation of the craft, which is controlled entirely by the directional gyroscope. The control of the directional gyroscope is therefore at no time interfered with by the rate gyroscope, as sometimes happens where both gyroscopes are connected to the master relay valve 6—17.

In the form shown in Fig. 3, the main supply pipe leading to all servomotors from the pump P is shown at 36'. In said pipe I place a by-pass valve 37—37' having a pipe connection 38 leading back to the sump. This valve is likewise preferably controlled from a two degree of freedom gyroscope 20' having a cam 21' on a trunnion thereof, but in this case the cam operates to gradually close valve 37 as the gyro precesses in either direction to decrease the amount of oil by-passed. Springs 43 yieldingly hold the valve open and also act to centralize the gyroscope. With the valve open to the maximum extent, a large part of the oil in the system is diverted back to the sump so that the pressure in the pipe beyond the by-pass outlet 39 is materially reduced. However, as the rate of turn pitch or yaw increases, the valve is closed, lessening the amount by-passed and therefore increasing the pressure to all the servomotors as the air grows rough and yawing increases.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In an automatic pilot for aircraft, the combination with a control surface, of a hydraulic servomotor for actuating the same, speed control means for varying the rate of flow of pressure liquid to said servomotor without affecting the direction of flow of said liquid, and an angular rate gyroscope for governing said means responsive to the rate of turn of the craft about the axis of control of said surface.

2. In an automatic pilot for aircraft, the combination with a control surface and a servomotor for actuating the same, of positional control means for causing operation of said motor in one direction or the other to correct the attitude of the craft upon departure from the desired position, means responsive to the angular rate of such departure, and means controlled thereby and independent of said positional control for increasing the speed of operation of said motor with increasing angular rates, but without affecting the directional control from said positional means.

3. In a hydraulically operated servomotor system for airplanes, a hydraulic pump, a servomotor, primary means for controlling the direction of flow of pressure fluid thereto in accordance with the direction of departure of the craft from the desired attitude, and independent automatic means for limiting the rate of flow thereof without affecting direction in accordance with the angular rate of departure of the craft from said attitude.

4. In a fluid operated servomotor system for airplanes, a fluid pressure pump, a servomotor for governing the attitude of the plane about an axis primary, means for controlling the direction of flow of pressure fluid thereto, a throttle valve between said pump and motor, and an angular rate gyroscope responsive to the rate of turn of the craft about said axis for adjusting said valve to decrease the rate of fluid flow to the motor in smooth air.

5. In an automatic pilot for aircraft, the combination with control surfaces for each major axis and a servomotor for each, dual means for actuating each servomotor comprising a positional control device and an angular rate device responsive to departure of the craft about the same axis, said first device governing the direction and rate of each motor and said second device limiting the rate of movement of each servomotor.

6. In an automatic pilot for aircraft, the combination with control surfaces for each major axis and a servomotor for each, positional control means for separately controlling the several servomotors to correct the attitude of the plane about each axis, a common pressure regulator for varying the pressure supplied to all servomotors, and an angular rate gyroscope responsive to angular movements of the craft about one of said axes for governing said regulator.

7. In a pneumatic-hydraulic automatic pilot, an attitude or positional gyroscope, a differential air pressure pick-off on said gyroscope responsive to departure of the craft from its predetermined attitude about an axis, an angular rate gyroscope responsive to turning of the craft about said axis, a pneumatic-hydraulic relay governed by said pick-off, a hydraulic servomotor controlled from said relay, and a throttle valve in the hydraulic system controlled by said rate gyroscope.

8. In a pneumatic-hydraulic automatic pilot, an attitude or positional gyroscope, an angular rate gyroscope, a differential air pressure pick-off from the former responsive to departure of the craft from the attitude maintained by the former, a pneumatic-hydraulic relay governed by said pick-off, a hydraulic servomotor controlled from said relay, and a by-pass valve in the hydraulic system controlled by said rate gyroscope acting to reduce the effective pressure when the rate of yaw is small.

9. In an automatic pilot for aircraft, the combination with a control surface, of a fluid pressure servomotor for actuating the same, a primary controller for controlling said motor responsive to the direction and amount of a change in the attitude of the craft, an independently controlled valve, and means responsive to the angular rate of change of said attitude independently of direction for adjusting said valve to independently limit the rate of fluid flow through said servomotor.

STEPHEN J. ZAND.